United States Patent
Wu

(10) Patent No.: US 7,176,984 B2
(45) Date of Patent: Feb. 13, 2007

(54) VIDEO SIGNAL SEPARATING METHOD AND RELATED APPARATUS

(75) Inventor: Jen-Shi Wu, Hsin-Chu (TW)

(73) Assignee: Mediatek Inc., Hsin-Chu Hsien (TW)

( * ) Notice: Subject to any disclaimer, the term of this patent is extended or adjusted under 35 U.S.C. 154(b) by 476 days.

(21) Appl. No.: 10/708,706

(22) Filed: Mar. 19, 2004

(65) Prior Publication Data

US 2004/0183952 A1 Sep. 23, 2004

(30) Foreign Application Priority Data

Mar. 21, 2003 (TW) .............................. 92106397 A

(51) Int. Cl.
*H04N 9/78* (2006.01)

(52) U.S. Cl. ...................... 348/663; 348/665; 348/667

(58) Field of Classification Search ................ 348/663, 348/665, 664, 668, 667, 669, 670
See application file for complete search history.

(56) References Cited

U.S. PATENT DOCUMENTS

| | | | |
|---|---|---|---|
| 4,703,342 A | 10/1987 | Takahashi | |
| 4,954,885 A | 9/1990 | Ito et al. | |
| 5,225,899 A | 7/1993 | Park | |
| 5,231,477 A | 7/1993 | Okumura et al. | |
| 5,231,478 A | 7/1993 | Fairhurst | |
| 5,386,244 A | 1/1995 | Gai | |
| 5,416,531 A | 5/1995 | Gai | |
| 5,416,532 A | 5/1995 | Ko | |
| 5,517,255 A * | 5/1996 | Gai et al. | 348/663 |
| 5,530,486 A * | 6/1996 | Hong | 348/663 |
| 5,663,771 A * | 9/1997 | Raby | 348/663 |
| 5,686,972 A * | 11/1997 | Kim | 348/663 |
| 5,898,464 A * | 4/1999 | Cho | 348/625 |
| 5,909,255 A * | 6/1999 | Hatano | 348/663 |
| 5,959,695 A * | 9/1999 | Sugimoto et al. | 348/663 |
| 5,969,771 A * | 10/1999 | Sugimoto et al. | 348/663 |
| 6,288,754 B1 * | 9/2001 | Ito | 348/663 |
| 6,504,579 B1 * | 1/2003 | Scherrer | 348/667 |
| 6,717,623 B2 * | 4/2004 | Mise et al. | 348/663 |
| 6,999,130 B2 * | 2/2006 | Tanigawa | 348/663 |
| 7,092,038 B2 * | 8/2006 | Shih et al. | 348/663 |

FOREIGN PATENT DOCUMENTS

EP 0 161 923 A2 11/1985

* cited by examiner

*Primary Examiner*—David Ometz
*Assistant Examiner*—Jean W. Désir
(74) *Attorney, Agent, or Firm*—Winston Hsu

(57) ABSTRACT

A method and/or apparatus for separating a video signal into a luminance signal and a chrominance signal is disclosed. The method first generates a target video signal and a plurality of reference video signals by delaying the video signal, then generates a plurality of intermediate signals such as an HCS, VCS and SLED according to the target signal and the plurality of reference signals, and finally generates the chrominance signal of the video signal by determining the HCS, the VCS, and the SLFD and generates the luminance signal of the video signal according to the chrominance signal of the video signal and the plurality of reference video signals.

13 Claims, 9 Drawing Sheets

VIDEO SIGNAL SEPARATING METHOD AND RELATED APPARATUS

BACKGROUND OF INVENTION

1. Field of the Invention

The present invention relates to a video signal separator, and more particularly, to a method and related apparatus for separating a luminance signal from a video signal.

2. Description of the Prior Art

It has been over fifty years since color TVs were introduced to the public. A composite color TV signal (video signal in brief) for a color TV includes luminance as well as chrominance information. A luminance signal of the video signal works with frequencies ranging from 0 (DC) to 5.5 MHz, while a chrominance signal, which is carried by a carrier, works from 3.58 MHz to 4.43 MHz and overlaps the luminance signal. Numerous patents, such as U.S. Pat. No. 4,703,342, U.S. Pat. No. 4,954,885, U.S. Pat. No. 5,225,899, U.S. Pat. No. 5,231,477, U.S. Pat. No. 5,231,478, U.S. Pat. No. 5,386,244, U.S. Pat. No. 5,416,531, U.S. Pat. No. 5,416,532, U.S. Pat. No. 5,517,255, and EP0161923A2, have disclosed different methods and apparatus to separate the luminance signal from the video signal.

FIG. 1 is a function block diagram of a video signal separator 10 according to the prior art. The video signal separator 10 is capable of separating an analog video signal into a luminance signal and a chrominance signal. The video signal separator 10 includes an analog/digital converter (ADC) 12 for converting the analog video signal into a digital downward reference video signal DRVS, a first line delay circuit 14 electrically connected to the ADC 12 for delaying the DRVS by one horizontal line (will be described in more details later) so as to generate a target video signal TVS, a second line delay circuit 16 electrically connected to the first line delay circuit 14 for delaying the TVS by one horizontal line so as to generate an upward reference video signal URVS, a horizontal reference chrominance signal generator 18 (HRCS generator) for receiving the DRVS, the TVS and the URVS so as to generate a horizontal reference chrominance signal HRCS, a vertical reference chrominance signal generator 20 (VRCS generator) for receiving the TVS so as to generate a vertical reference chrominance signal VRCS, a horizontal/vertical reference chrominance signal generator 22 (HVRCS generator) for receiving the DRVS, the TVS and the URVS so as to generate a horizontal/vertical reference chrominance signal HVRCS, a judging device 24 for receiving the DRVS, the TVS and the URVS so as to generate a select signal, a multiplexer 26 for outputting one of three signals HRCS, VRCS and HVRCS by determining the select signal transmitted from the judging device 24, and a subtractor 28 for subtracting signals output by the multiplexer 26 from the TVS so as to generate the luminance signal, and a signal output from the multiplexer 26 being the chrominance signal.

The ADC 12 samples the analog video signal with a sampling frequency $f_s$, which is four times a color subcarrier $f_{sc}$, and generates the DRVS, so chrominance signals of two adjacent sampling points have ninety degrees of phase difference. Since the color subcarrier $f_{sc}$ is equal to $(455/2)$ fH, wherein fH is a horizontal scan frequency, which is equal to the amount of horizontal scan lines projected onto a screen 40 per second by a cathode tube of a color TV, chrominance signals of any sampling points on two adjacent horizontal scan lines have 180 degrees of phase difference. FIG. 2 illustrates a phase diagram of chrominance signals of any sampling points of three adjacent horizontal scan lines on screen 40 according to the prior art. A first line 42, a second line 44 and a third line 46 each include five sampling points, and an arrow embraced in a sampling point indicates a phase of the sampling point. For example, three sampling points 48, 50 and 52 are respectively represented by Y+C, Y−C and Y+C, wherein Y represents a luminance signal of a sampling point while C represents a chrominance signal of a sampling point, and chrominance signals of the sampling points 48 (Y+C) and 50 (Y−C) have 180 degrees of phase difference.

Operations of the video signal separator 10 are described as follows: Please refer to FIG. 1 again. When a video signal of an NTSC (National Television Standards Committee) system travels through the ADC 12, the ADC 12 transforms the video signal into the DRVS with the sampling frequency $f_s$. Then the first line delay circuit 14 delays the DRVS by a horizontal scan line so as to generate the TVS. The second line delay circuit 16 delays the TVS by a horizontal scan line and generates the URVS. The HRCS generator 18, the VRCS generator 20 and the HVRCS generator 22 respectively transform the DRVS, the TVS, and the URVS into the HRCS, the VRCS, and the HVRCS. For example, a transfer function for the HRCS generator 18 can be $Ch(Z)=(-1/4)(1-Z^{-2})^2$, a transfer function for the VRCS generator 20 can be $Cv(Z)=(-1/4)(1-Z^{-L})^2$, and a transfer function for the HVRCS generator 22 can be $Chv(Z)=(-1/4)(1-Z^{-2})^2(-1/4)(1-Z^{-L})^2$, wherein $Z^{-1}$ represents delaying a sampling point while $Z^{-L}$ represents delaying a horizontal scan line. Then the multiplexer 26 determines the select signal transmitted from the judging device 24 and outputs one of the HRVS, the VRCS and the HVRCS. How the judging device 24 generates the select signal is described as follows.

FIG. 3 illustrates a function block diagram of the judging device 24 according to the prior art. The judging device 24 includes a horizontal luminance signal non-correlated value calculator 60 (HLNC calculator) for calculating a horizontal luminance signal non-correlated value HLNC, a horizontal chrominance signal non-correlated value calculator 62 (HCNC generator) for calculating a horizontal chrominance signal non-correlated value HCNC, a vertical luminance signal non-correlated value calculator 64 (VLNC generator) for calculating a vertical luminance signal non-correlated value VLNC, and a vertical chrominance signal non-correlated value calculator 66 (VCNC generator) for calculating a vertical chrominance signal non-correlated value VCNC, and a judging circuit 68 for generating the select signal according to the HLNC, the HCNC, the VLNC and the VCNC. The judging circuit 68 determines a smallest non-correlated value among these four non-correlated values and generates the select signal to guide the multiplexer 26 to output the HRVS, the VRCS or the HVRCS according to the smallest non-correlated value. The aforementioned calculator 60, 62, 64 and 66 are all used to calculate non-correlation among a plurality of signals. The non-correlation calculation is well known by those skilled in the art, and a detailed description is omitted here.

As the judging device 24 generates the select signal, the multiplexer 26 is capable of generating the chrominance signal according to the select signal. Then the subtractor 28 calculates the luminance signal by subtracting the chrominance from the video signal, that is, separating the luminance signal from the video signal.

The video signal separator 10 of the prior art has at least two drawbacks:

1. The judging device 24 of the video signal separator 10 depends on only three video signals (the DRVS, TVS and URVS) to generate the select signal. That the judging device 24 depends on only the TVS and two video signals respectively disposed upward and downward next to the TVS to generate the select signal is likely to generate a non-appropriate select signal and further calculates a false luminance signal and chrominance signal as well. For example, if the differences from the TVS to the upward as well as to the downward video signal are both significantly large while these two differences differs slightly from each other, the VLNC calculator 64 of the judging device 24 calculates a small VLNC and the judging circuit 68 transmits corresponding select signal to the multiplexer 26 according to the small VLNC, misleading the multiplexer 26 to output false luminance signal and chrominance signal.

2. The video signal separator 10 of the prior art generates the luminance signal as well as the chrominance signal in a so-called hard decision way—the multiplexer 26 only outputs one of the HRVS, TVS and VRVS as the luminance signal. When the non-correlated values respectively generated by the calculators 60, 62, 64 and 66 differs significantly from one another, the hard decision can calculate a luminance signal and a chrominance signal both with a tolerable error. However, when the non-correlated values generated by the calculators 60, 62, 64 and 66 are not significantly differ from one another, the select signal output from the judging device 24 by referring to these non-correlated values may mislead the multiplexer 26 to output improper luminance signal and chrominance signal.

SUMMARY OF INVENTION

It is therefore an objective of the present invention to provide a video signal separator and related apparatus capable of separating a luminance signal from a video signal of a video image displayed on a display device based on five horizontal scan lines to overcome the drawbacks of the prior art.

In one embodiment, the method includes the following steps: displaying the video image onto the display device in an interlaced way, utilizing a processor to calculate a first factor by determining the video signal and a plurality of first video signals neighboring the video signal, utilizing the processor to calculate a second factor by determining the video signal and at least one second video signal, which also neighbors the video signal but is distinct from the plurality of the first video signals, and utilizing the processor to determine the luminance signal of the video signal according to the video signal, the plurality of first video signals, the second video signal, the first factor, and the second factor.

According to the embodiment, the video signal separator is capable of separating a video signal sampled from a composite color TV signal according to a sampling frequency into a luminance signal and a chrominance, the video signal separator including a plurality of delay circuits for generating a target video signal and a plurality of reference video signals by delaying the video signal, an HCS generator for generating an HCS according to the target video signal, an SLFD generator for generating an SLFD according to the target video signal and the plurality of reference video signals, a VCS generator for generating a VCS, a chrominance signal generator for generating the chrominance signal of the video signal by determining the HCS, the VCS, and the SLFD, and a luminance signal generator for generating the luminance signal of the video signal according to the chrominance signal of the video signal and signals output from the plurality of delay circuits. The VCS generator includes a UDFD generator for generating a UDFD according to the target video signal and the plurality of reference video signals and a VRVS generator for generating a plurality of VRVSs according to the target video signal and the plurality of reference video signals, wherein the VCS corresponds to the UDFD and the plurality of VRVSS.

It is an advantage of the invention that a video signal separator for separating a luminance signal from a video signal according to differences of a horizontal scan line and another four horizontal scan lines in soft decision can prevent an error that a judging device of the prior art video signal separator makes in determining a select signal from occurring.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
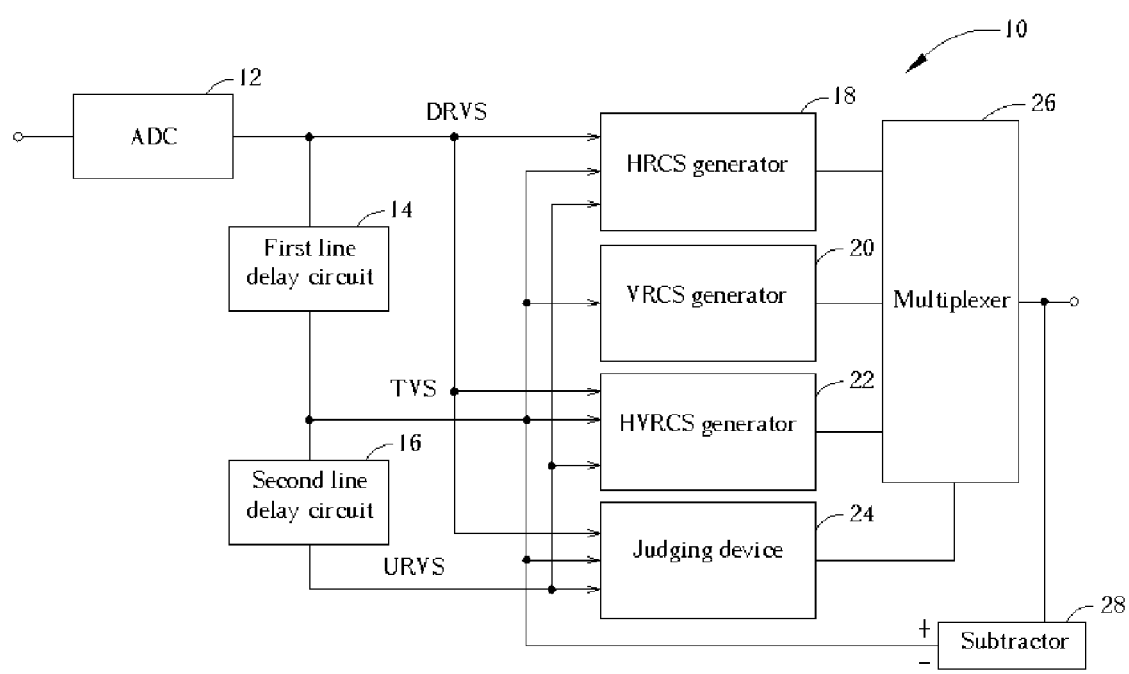
FIG. 1 is a function block diagram of a video signal separator according to the prior art.
Figure 2:
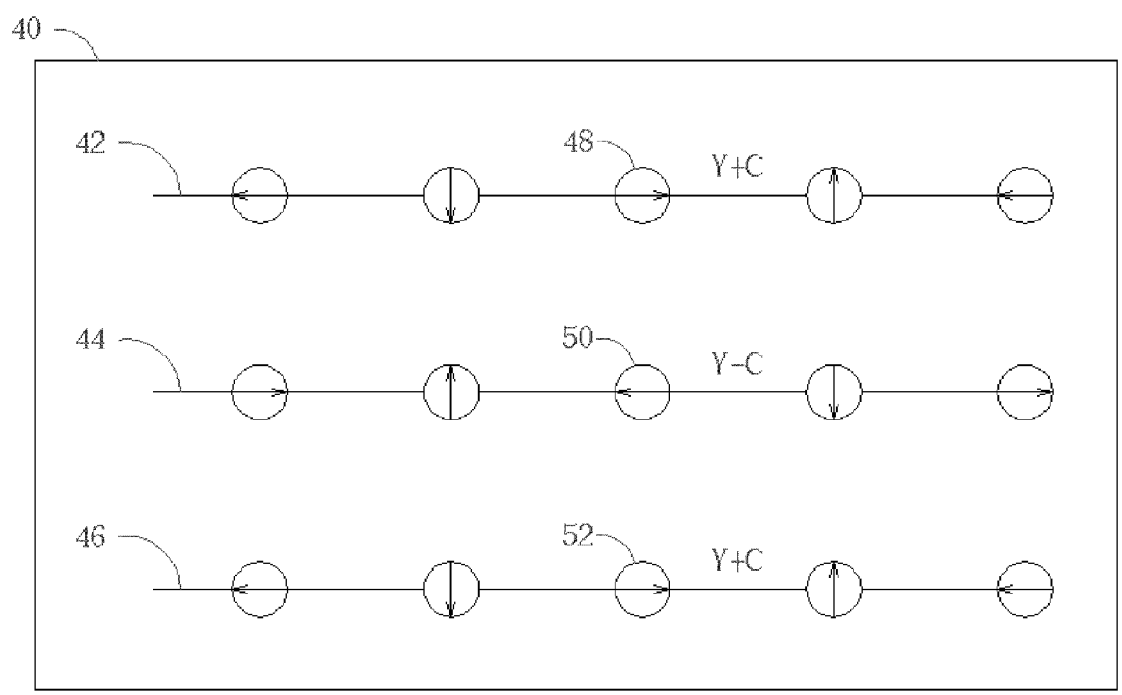
FIG. 2 is a phase diagram of chrominance signals of any sampling points of three adjacent horizontal scan lines according to the prior art.
Figure 3:
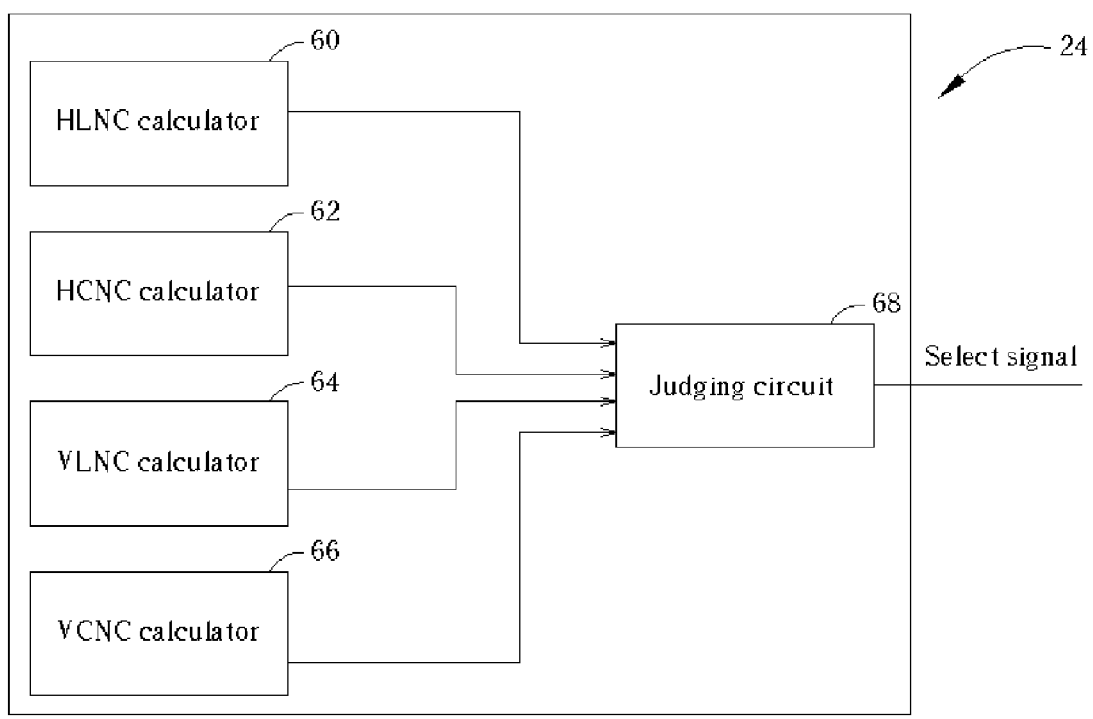
FIG. 3 is a function block diagram of a judging device of the video signal separator shown in FIG. 1 according to the prior art.
Figure 4:
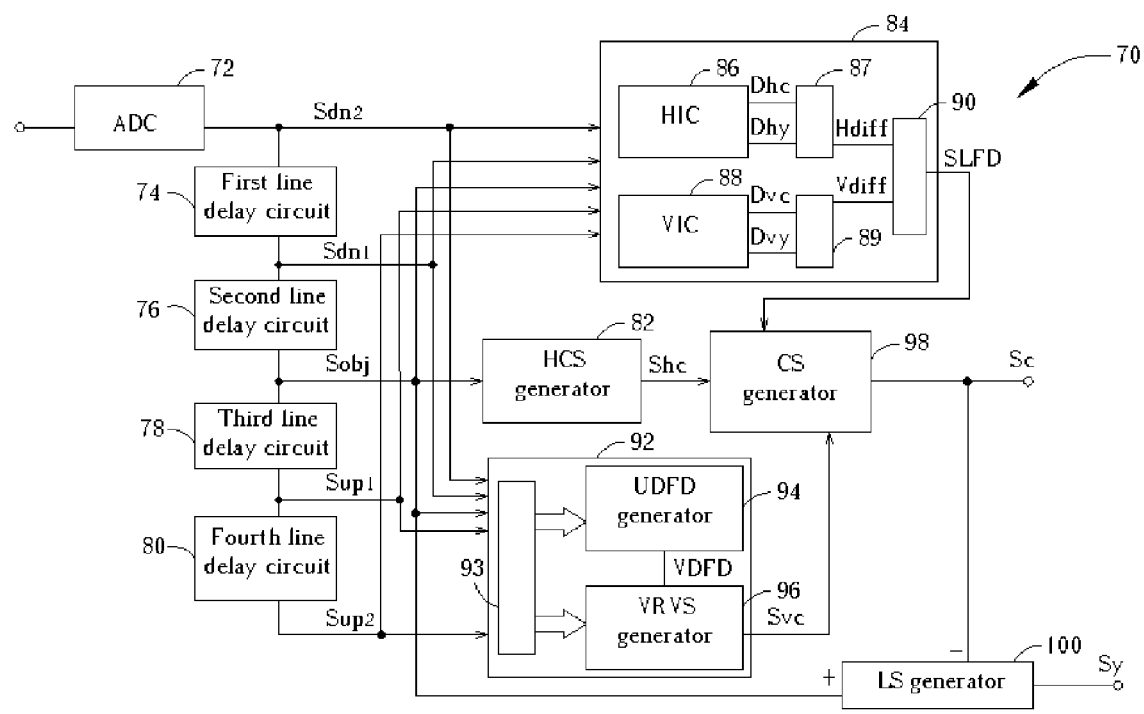
FIG. 4 is a function block diagram of a video signal separator according to the present invention.

FIG. 4 is a function block diagram of a video signal separator 70 according to one embodiment of the present invention. The video signal separator 70 is capable of separating a video signal, like an NTSC signal as well as a PAL (phase alternation by line) signal, into a luminance signal $S_c$ and a chrominance signal $S_y$. The video signal separator 70 includes an ADC 72 for transferring a video signal into a digital second downward reference video signal $S_{dn2}$, a first line delay circuit 74 for delaying the $S_{dn2}$ by a horizontal scan line so as to generate a first downward reference video signal $S_{dn1}$, a second line delay circuit 76 for delaying the $S_{dn1}$ by a horizontal scan line so as to generate a target video signal $S_{obj}$, a third line delay circuit 78 for delaying the $S_{obj}$ by a horizontal scan line so as to generate a first upward reference video signal $S_{up1}$, a fourth line delay circuit 80 for delaying the $S_{up1}$ by a horizontal scan line so as to generate a second upward reference video signal $S_{up2}$, a horizontal chrominance signal generator 82 (HCS generator) for generating a horizontal chrominance signal $S_{hc}$ according to the $S_{obj}$, a horizontal/vertical fading factor generator 84 (SLFD generator) for generating a horizontal/vertical fading factor SLFD according to the $S_{obj}$ as well as the plurality of reference video signals $S_{dn1}$, $S_{dn\ 2}$, $S_{up1}$ and $S_{up2}$, a vertical chrominance signal generator 92 (VCS generator) for generating a vertical chrominance signal $S_{vc}$, a chrominance signal generator 98 (CS generator) for generating the $S_c$ according to the $S_{hc}$, the $S_{vc}$, the SLFD and an equation 1 $S_c$=SLFD*$S_{hc}$+(1−SLFD)*$S_{vc}$, and a luminance signal generator 100 (LS generator) for generating the $S_y$ by subtracting the $S_c$ from the $S_{obj}$.

How the SLFD generator 84 generates the SLFD is described as follows: Please refer to FIG. 4 again. The SLFD generator 84 of the video signal separator 70 includes a horizontal interference calculator 86 (HIC) for calculating a horizontal chrominance interfering factor $D_{hc}$ as well as a horizontal luminance interfering factor $D_{hy}$ according to the reference signals $S_{dn1}$, $S_{dn\ 2}$, $S_{up1}$ and $S_{up2}$, a horizontal difference generator 87 ($H_{diff}$ generator) for generating a horizontal difference $H_{diff}$ according to the $D_{hc}$ as well as the $D_{hy}$, a vertical interference calculator 88 (VIC) for calculating a vertical chrominance interfering factor $D_{vc}$ as well as a vertical luminance interfering factor $D_{vy}$ according to the reference signals $S_{dn1}$, $S_{dn\ 2}$, $S_{up1}$ and $S_{up2}$, a vertical difference generator 89 ($V_{diff}$ generator) for generating a vertical difference $V_{diff}$ according to the $D_{vc}$ as well as the $D_{vy}$, and an SLFD module 90 for generating the SLFD according to the $H_{diff}$, the $V_{diff}$ and an equation 2 SLFD=Lim (k*$V_{diff}$−$H_{diff}$), wherein k is a weighing factor and Lim( ) is a Sigmoid-like curve.

Figure 5:
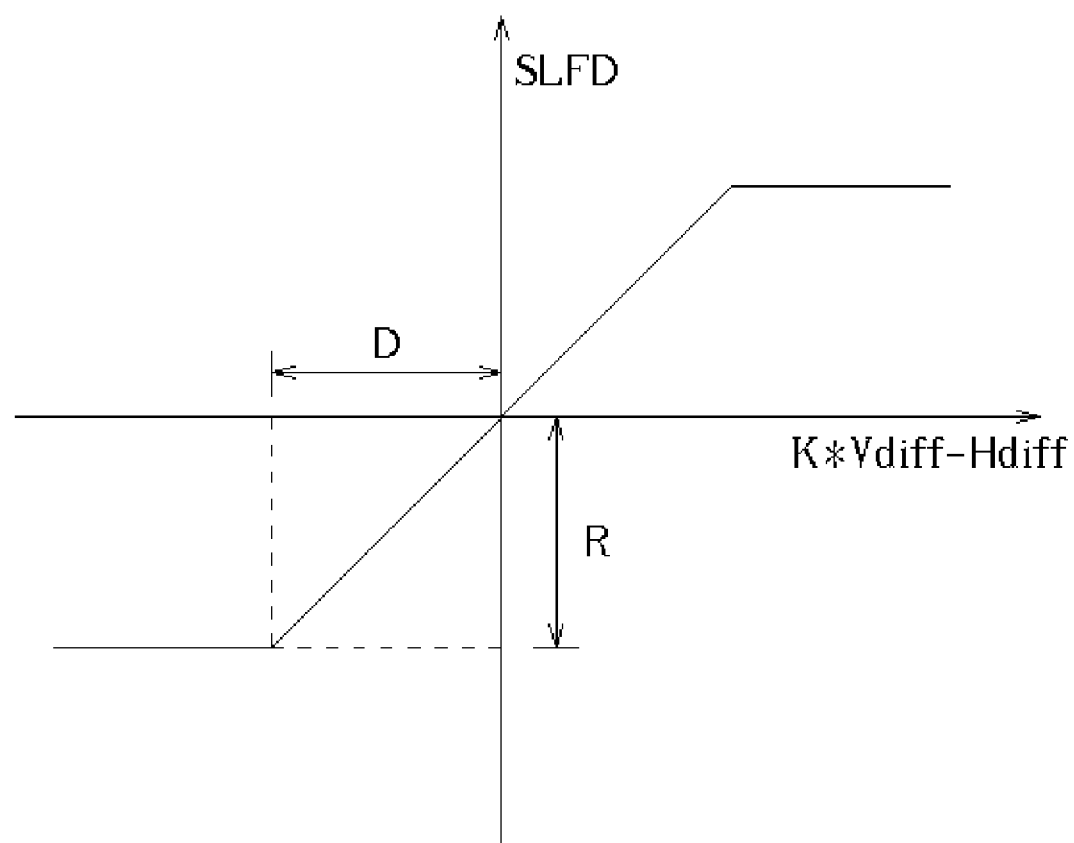
FIG. 5 is a diagram of a Sigmoid-like curve.

FIG. 5 illustrates a diagram of the Sigmoid-like curve in this embodiment. As shown in FIG. 5, when k*$V_{diff}$−$H_{diff}$ is greater or less than a tolerance of error D, the video signal separator 70 is not different from the video signal separator 10 of the prior art. When k*$V_{diff}$−$H_{diff}$ falls into a region from +D to D, the video signal separator 70 of the present invention generates the $S_c$ as well as the $S_y$ by dec termining an SLFD mapped on the Sigmoid-like curve by k*$V_{diff}$−$H_{diff}$. In essence, this embodiment generates $S_c$ and $S_y$ in a so-called soft decision instead of the hard decision. The SLFD can be treated as a weighing factor for the calculations between $S_{hc}$ and $S_{vc}$ to generate $S_c$ and $S_y$. In other words, if k*$V_{diff}$ is less than $H_{diff}$ by D, this indicating that a difference between the vertical samples multiplied by k is much less than a difference between the horizontal samples, the video signal separator 70 therefore generates the $S_c$ and the $S_y$ according to the $S_{vc}$; on the contrary, if k*$V_{diff}$ is greater than $H_{diff}$ by D, the video signal separator 70 generates the $S_c$ and the $S_y$ according to the $S_{hc}$. The $H_{diff}$ generator 87 of the SLDF generator 84 refers to an equation $3H_{diff}$=a*$D_{hy}$+(1−a)*$D_{hc}$ to calculate $H_{diff}$ while the $V_{diff}$ generator 89 of the SLDF generator 84 refers to an equation 4 $V_{diff}$=b*$D_{vy}$+(1−a)*$D_{vc}$ to calculate $V_{diff}$. An a in the equation 3 and a b in the equation 4 are both weighing factors and can be modified according to the video signal or to a TV system from which the video signal comes.

Figure 6:
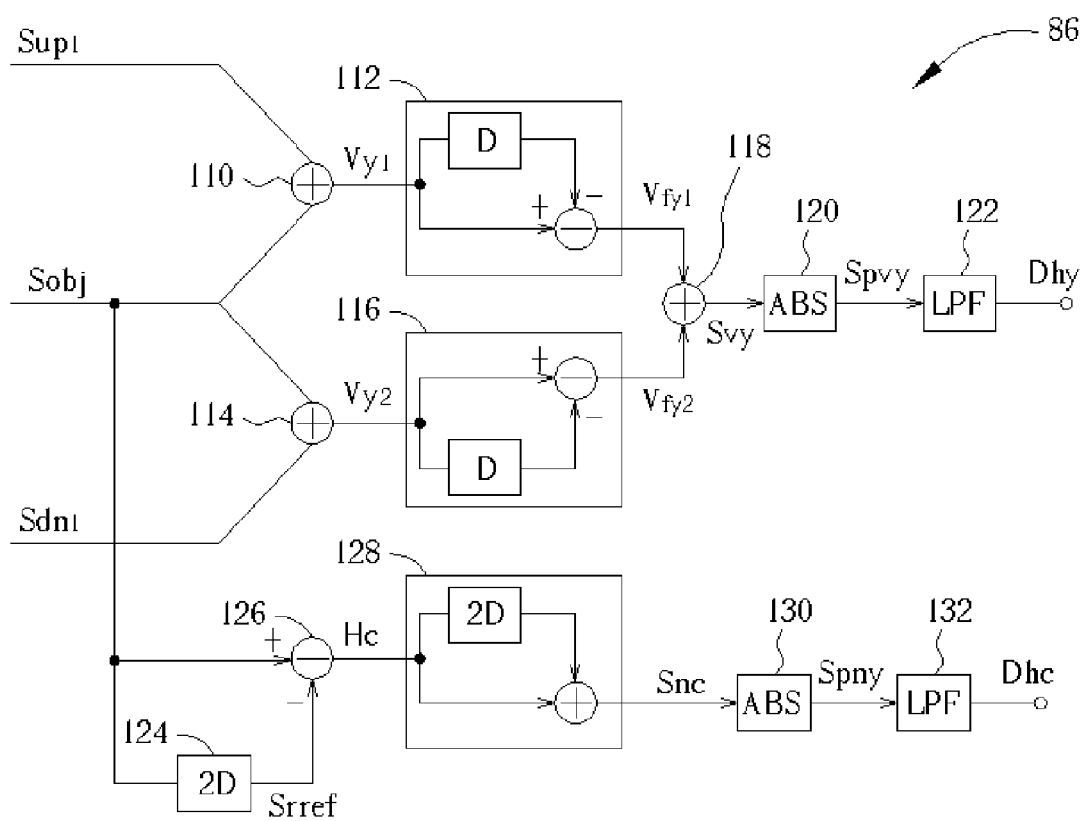
FIG. 6 is a function block diagram of an HIC of the video signal separator shown in FIG. 4 according to the present invention.
Figure 7:
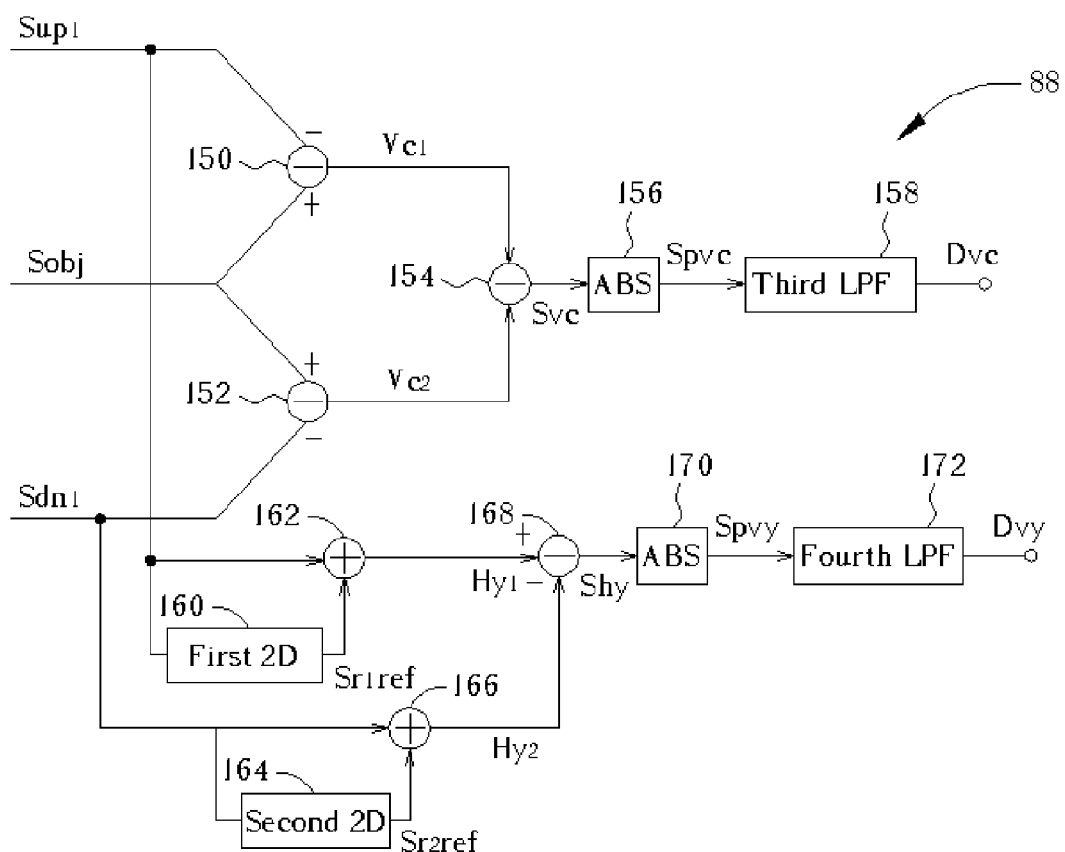
FIG. 7 is a function block diagram of a VIC of the video signal separator shown in FIG. 4 according to the present invention.

The process to generate $D_{hc}$, $D_{hy}$, $D_{vc}$ and $D_{vy}$ is described as follows: Please refer to FIG. 6 and FIG. 7. FIG. 6 is a circuit diagram of the HIC 86. FIG. 7 is a circuit diagram of the VIC 88. The HIC 86 includes a first adder 110 for generating a first vertical luminance interfering signal $V_{y1}$ by adding the $S_{up1}$ to the $S_{obj}$, a first 1-D comb filter 112 for transferring the $V_{y1}$ into a first vertical luminance filtered signal $V_{fy1}$, a second adder 114 for generating a second vertical luminance interfering signal $V_{y2}$ by adding the $S_{dn1}$ to the $S_{obj}$, a second 1-D comb filter 116 for transferring the $V_{y2}$ into a second vertical luminance filtered signal $V_{fy2}$, a third adder 118 for generating a vertical luminance signal $S_{vy}$ by adding the $V_{fy2}$ to the $v_{fy1}$, a first absoluter 120 for transferring the $S_{vy}$ into a positive vertical luminance signal $S_{pvy}$, a first low pass filter 122 for transferring the $S_{pvy}$ into the $D_{hy}$, a sample point delay circuit 124 for generating a rightward reference video signal $S_{rref}$ by delaying the $S_{obj}$ by two sampling points, a subtractor 126 for generating a horizontal chrominance interfering signal $H_c$ by subtracting the $S_{rref}$ from the $S_{obj}$, a 2-D comb filter 128 for transferring the $H_c$ into a horizontal chrominance filtered signal $H_{fc}$, a second absoluter 130 for transferring the $H_{fc}$ into a positive horizontal chrominance signal $S_{phc}$, and a second low pass filter 132 for transferring the $S_{phc}$ into the $D_{hc}$.

The VIC 88 includes a first subtractor 150 for generating a first vertical chrominance interfering signal $V_{c1}$ by subtracting the $S_{up1}$ from the $S_{obj}$, a second subtractor 152 for generating a second vertical chrominance interfering signal $V_{c2}$ by subtracting the $S_{dn1}$ from the $S_{obj}$, a third subtractor 154 for generating a vertical chrominance signal $S_{vc}$ by subtracting the $V_{c1}$ from the $V_{c2}$, a third absoluter 156 for transferring the $S_{vc}$ into a positive vertical chrominance signal $S_{pvc}$, a third low pass filter 158 for transferring the $S_{pvc}$ into the $D_{vc}$, a first sample point delay circuit 160 (first 2D) for generating a first rightward reference video signal $S_{r1ref}$ by delaying the $S_{up1}$ by two sampling points, a fourth adder 162 for generating a first luminance interfering signal $H_{y1}$ by adding the $S_{up1}$ to the $S_{r1ref}$, a second sample point delay circuit 164 (second 2D) for generating a second rightward reference video signal $S_{r2ref}$ by delaying the $S_{dn1}$ by two sampling points, a fifth adder 166 for generating a second horizontal luminance interfering signal $H_{y2}$ by adding the $S_{dn1}$ to the $S_{r2ref}$, a fourth subtractor 168 for generating a horizontal luminance signal $S_{hy}$ by subtracting the $H_{y1}$ from the $H_{y2}$, a fourth absoluter 170 for transferring the $S_{hy}$ into a positive horizontal luminance signal $S_{phy}$, and a fourth low pass filter 172 for transferring the $S_{phy}$ into the $D_{vy}$.

How the VCS generator 92 generates the $S_{vc}$ is described as follows: The VCS generator 92 includes a intermediate video signal generator 93 (IVS generator) for generating a plurality of intermediate video signals according to the $S_{obj}$ and the $S_{dn1}$, $S_{dn\ 2}$, $S_{up1}$ and $S_{up2}$, an up/down fading factor generator 94 (UDFD generator) for calculating an UP/down fading factor UDFD according the plurality of intermediate video signals, and a vertical reference video signal generator 96 (VRVS generator) for generating the $S_{vc}$ according to the UDFD and the plurality of intermediate video signals.

How the IVS generator 93 of the VCS generator 92 generates the plurality of intermediate video signals is described as follows: Please refer to FIG. 8, which is a function block diagram of the IVS generator 93 according to the present invention. The IVS generator 93 includes a first upward video signal generator 180 for generating a first upward video signal $S_{sup1}$ according to the $S_{obj}$ and the $S_{up1}$, a second upward video signal generator 182 for generating a second upward video signal $S_{sup2}$ according to the $S_{up1}$ and the $S_{up2}$, a first downward video signal generator 184 for generating a first downward video signal $S_{sdn1}$ according to the $S_{obj}$ and the $S_{dn1}$, and a second downward video signal generator 186 for generating a second downward video signal $S_{sdn2}$ according to the $S_{dn1}$ and the $S_{dn2}$.

Video signal generators 180, 182, 184 and 186 of the IVS generator 93 respectively include an adder 188, a multiplier 190, a subtractor 192 and a demodulator 194. The plurality of intermediate video signals $S_{sup1}$, $S_{sup2}$, $S_{sdn1}$ and $S_{sdn2}$ each includes a video luminance signal, a first chrominance signal heading to a first direction, and a second chrominance signal heading to a second direction, which is not parallel but usually perpendicular to the first direction.

Figure 8:
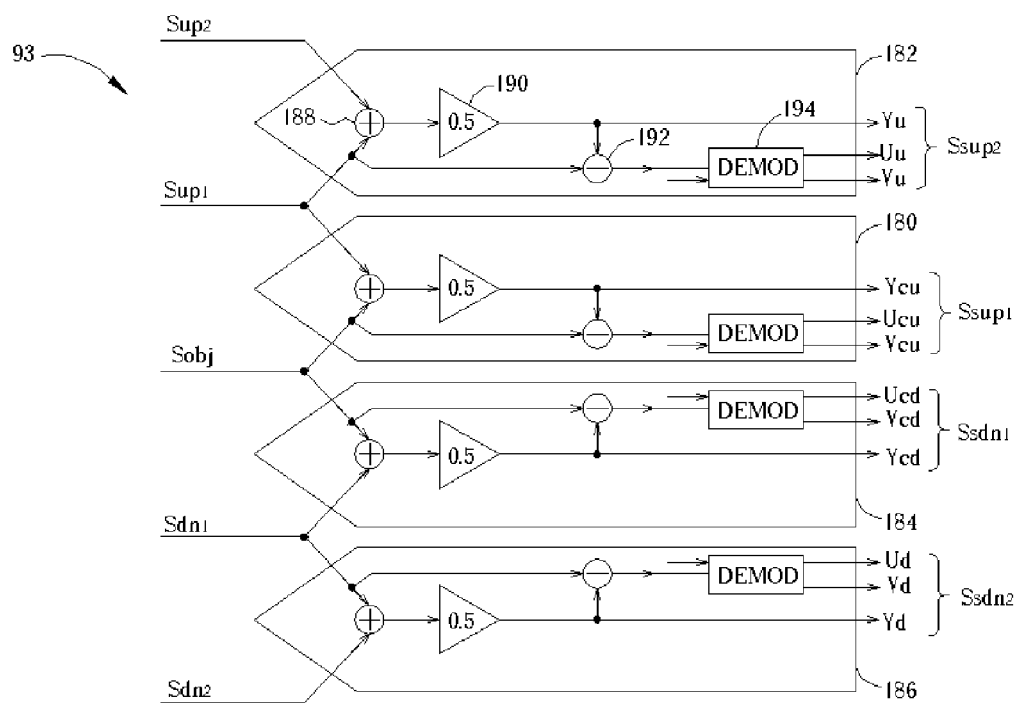
FIG. 8 is a function block diagram of intermediate reference signal generators of the video signal separator shown in FIG. 4 according to the present invention.

How the plurality of video generators 180, 182, 184 and 186 generate a video luminance signal $Y_{cu}$, a video first chrominance signal $U_{cu}$ and a video second chrominance signal $V_{cu}$, all shown in FIG. 8, is described as follows: Cite the first upward video signal generator 180 as an example. The $Y_{cu}$ is an arithmetic mean of the $S_{up1}$ and the $S_{obj}$. The $U_{cu}$ and the $V_{cu}$ are both demodulated from the demodulator 194 by demodulating a signal generated by subtracting the $Y_{cu}$ from the $S_{obj}$. The demodulator 194 demodulates the $Y_{cu}$ based on the carrier (mentioned in prior art).

Figure 9:
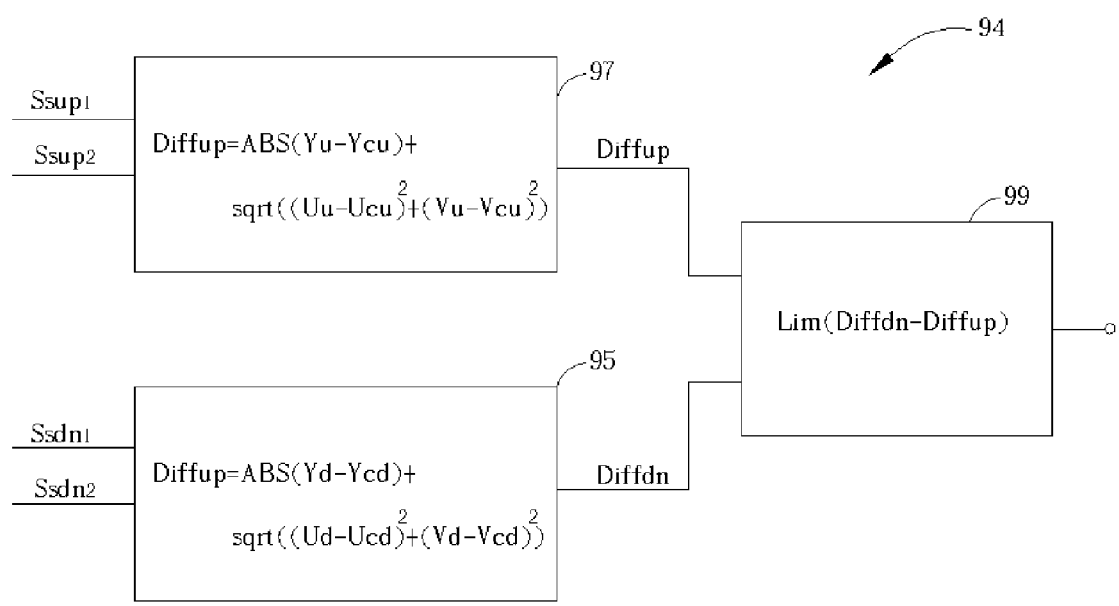
FIG. 9 is a function block diagram of a UDFD generator of the video signal separator shown in FIG. 4 according to the present invention.

How the UDFD generator 94 of the VCS generator 92 generates the UDFD is described as follows: FIG. 9 is a function block diagram of the UDFD generator 94 according to the embodiment. The UDFD generator 94 includes an upward difference generator 97 for generating an upward difference $\text{Diff}_{up}$ according to the $S_{sup1}$ and the $S_{sup2}$, a downward difference generator 95 for generating a downward difference $\text{Diff}_{dn}$ according to the $S_{sdn1}$ and the $S_{sdn2}$, and an upward/downward difference module 99 for generating the UDFD according to the $\text{Diff}_{up}$ and the $\text{Diff}_{dn}$. The UDFD, the $\text{Diff}_{up}$ and the $\text{Diff}_{dn}$ obey an equation 5-UDFD=$\text{Lim}(\text{Diff}_{dn}-\text{Diff}_{up})$, wherein $\text{Diff}_{up}=\text{ABS}(Y_u-Y_{cu})+\text{sqrt}((U_u-U_{cu})^2+(V_u-V_{cu})^2)$, wherein $\text{ABS}(x)$ represents an absolute value of x, and $\text{sqrt}(y)$ is a square root of y.

In contrast to the prior art, the present invention can provide a video signal separator, which is capable of calculating differences between a video signal located on a horizontal scan line and another four horizontal scan lines, and of then calculating a luminance signal and a chrominance signal of the video signal in soft decision based on the differences and these five horizontal scan lines, for preventing an error the judging device 24 of the prior art video signal separator 10 makes in determining the select signal from occurring. Additionally, the weighing factors k, a and b in equation 1, 2 and 3 can be selectively modified to adapt to a video signal and a TV system in which the video system stays as well.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for separating a video signal into a luminance signal and a chrominance signal, the video signal being sampled from a composite color TV signal according to a sampling frequency, the method comprising the following steps:
 (a) generating a target video signal and a plurality of reference video signals by delaying the video signal;
 (b) generating an HCS according to the target video signal;
 (c) generating an SLFD according to the target video signal and the plurality of reference video signals;
 (d) generating a UDFD and a plurality of VRVSs according to the target video signal and the plurality of reference video signals;
 (e) generating a VCS according to the UDFD and the plurality of VRVSs;
 (f) generating the chrominance signal of the video signal by determining the HCS, the VCS, and the SLFD; and
 (g) generating the luminance signal of the video signal according to the chrominance signal of the video signal and the plurality of reference video signals.

2. The method of claim 1, wherein the plurality of reference video signals generated in step (a) comprises a first URVS, a second URVS, a first DRVS, and a second DRVS, the video signal being the second DRVS, the first DRVS lagged the video signal by a predetermined numbers of scan lines, the target video signal lagged the first DRVS by the predetermined numbers of scan lines, the first URVS lagged the target video signal by the predetermined numbers of scan lines, and the second DRVS lagged the first URVS by the predetermined numbers of scan lines, and step (d) comprises the following steps:
 (h) generating a first UVS according to the target video signal and the first URVS;
 (i) generating a second UVS according to the first URVS and the second URVS;
 (j) generating a first DVS according to the target video signal and the first DRVS;
 (k) generating a second DVS according to the first DRVS and the second DRVS;
 (l) generating a $\text{Diff}_{up}$ according to the first UVS and the second UVS;
 (m) generating a $\text{Diff}_{dn}$ according to the first DVS and the second DVS; and
 (n) generating the UDFD according to the $\text{Diff}_{up}$ and the $\text{Diff}_{dn}$.

3. The method of claim 2, wherein the UDFD is equal to $\text{Lim}(\text{Diff}_{dn}-\text{Diff}_{up})$, Lim( ) being a Sigmoid-like curve.

4. A video signal separator for separating a video signal into a luminance signal and a chrominance signal, the video signal being sampled from a composite color TV signal according to a sampling frequency, the video signal separator comprising:
 a plurality of delay circuits for generating a target video signal and a plurality of reference video signals by delaying the video signal;
 an HCS generator for generating an HCS according to the target video signal;
 an SLFD generator for generating an SLFD according to the target video signal and the plurality of reference video signals;
 a VCS generator for generating a VCS, the VCS generator comprising:
  a UDFD generator for generating a UDFD according to the target video signal and the plurality of reference video signals; and
  a VRVS generator for generating a plurality of VRVSs according to the target video signal and the plurality of reference video signals;
 wherein the VCS corresponds to the UDFD and the plurality of VRVSs;
 a chrominance signal generator for generating the chrominance signal of the video signal by determining the HCS, the VCS, and the SLFD; and
 a luminance signal generator for generating the luminance signal of the video signal according to the chrominance signal of the video signal and signals output from the plurality of delay circuits.

5. The video signal separator of claim 4, wherein the plurality of reference video signals comprises a first URVS, a second URVS, a first DRVS, and a second DRVS, the video signal being the second DRVS, the plurality of delay circuits comprising:
 a first delay circuit for generating the first DRVS by delaying the video signal by a predetermined numbers of scan lines;

a second delay circuit for generating the target video signal by delaying the first DRVS by the predetermined numbers of scan lines;

a third delay circuit for generating the first URVS by delaying the target video signal by the predetermined numbers of scan lines; and a fourth delay circuit for generating the second DRVS by delaying the first URVS by the predetermined numbers of scan lines;

the VRVS generator comprising:

a first UVS generator for generating a first UVS according to the target video signal and the first URVS;

a second UVS generator for generating a second UVS according to the first URVS and the second URVS;

a first DVS generator for generating a first DVS according to the target video signal and the first DRVS; and a second DVS generator for generating a second DVS according to the first DRVS and the second DRVS; and the UDFD generator comprising:

a $Diff_{up}$ generator for generating a $Diff_{up}$ according to the first UVS and the second UVS;

a $Diff_{dn}$ generator for generating a $Diff_{dn}$ according to the first DVS and the second DVS; and a UDDM for generating the UDFD according to the $Diff_{up}$ and the $Diff_{dn}$.

6. The video signal separator of claim 5, wherein the UDFD is equal to $Lim(Diff_{dn}-Diff_{up})$, Lim( ) being a Sigmoid-like curve.

7. The video signal separator of claim 5, wherein the first UVS comprises a $Y_{cu}$, a $U_{cu}$ heading to a first direction and a $V_{cu}$ heading to a second direction, which is not parallel to the first direction, and the second UVS comprises a $Y_u$, a $U_u$ heading to the first direction and a $V_u$ heading to the second direction, wherein $Diff_{up}$ is equal to $ABS(Y_u-Y_{cu})+SQRT((U_u-U_{cu})^2+(V_u-V_{cu})^2)$, ABS(x) being an absolute value of x, and SQRT(y) being a square root of y.

8. The video signal separator of claim 5, wherein the first DVS comprises a $Y_{cd}$, a $U_{cd}$ heading to a first direction and a $V_{cd}$ heading to a second direction, which is not parallel to the first direction, and the second DVS comprises a $Y_d$, a $U_d$ heading to the first direction and a $V_d$ heading to the second direction, wherein $Diff_{dn}$ is equal to $ABS(Y_d-Y_{cd})+SQRT((U_d-U_{cd})^2+(V_d-V_{cd})^2)$, ABS(x) being an absolute value of x, and SQRT(y) being a square root of y.

9. The video signal separator of claim 4, wherein the SLFD generator comprises:

a horizontal interference calculator for calculating a $D_{hc}$ and an $D_{hy}$ according to the target video signal and the plurality of reference video signals;

a vertical interference calculator for calculating a $D_{hc}$ and an $D_{hy}$ according to the target video signal and the plurality of reference video signals;

an $H_{diff}$ generator for generating an $H_{diff}$ according to the $D_{hc}$ and the $D_{hy}$;

an $V_{diff}$ generator for generating an $V_{diff}$ according to the $D_{vc}$ and the $D_{vy}$; and an SLFD module for generating the SLFD according to the $H_{diff}$ and the $V_{diff}$;

wherein the SLFD is equal to $Lim(k*V_{diff}-H_{diff})$, Lim( ) being a Sigmoid-like curve, and k a weighing factor.

10. The video signal separator of claim 9, wherein the horizontal interference calculator comprises:

a first adder for generating a first vertical luminance interfering signal by adding an upward reference video signal to the target video signal, the upward reference video signal lagging the target video signal by a predetermined number of horizontal scan lines;

a first 1-D comb filter for transferring the vertical luminance interfering signal into a first vertical luminance filtered signal;

a second adder for generating a second vertical luminance interfering signal by adding a downward reference video signal to the target video signal, the downward reference video signal leading the target video signal by the predetermined number of horizontal scan lines;

a second 1-D comb filter for transferring the second vertical luminance interfering signal into a second vertical luminance filtered signal;

a third adder for generating a vertical luminance signal by adding the first vertical luminance filtered signal to the second vertical luminance filtered signal;

a first absoluter for transferring the vertical luminance signal into a positive vertical luminance signal;

a first low pass filter for transferring the positive vertical luminance signal into the $D_{hy}$;

a sample point delay circuit for generating a rightward reference video signal by delaying the target video signal by two sampling points;

a subtractor for generating a horizontal chrominance interfering signal by subtracting the rightward reference video signal from the target video signal;

a 2-D comb filter for transferring the horizontal chrominance interfering signal into a horizontal chrominance filtered signal;

a second absoluter for transferring the horizontal chrominance filtered signal into a positive horizontal chrominance signal; and a second low pass filter for transferring the positive horizontal chrominance signal into the $D_{hc}$.

11. The video signal separator of claim 9, wherein the vertical interference calculator comprises:

a first subtractor for generating a first vertical chrominance interfering signal by subtracting an upward reference video signal from the target video signal, the upward reference video signal lagging the target video signal by a predetermined number of horizontal scan lines;

a second subtractor for generating a second vertical chrominance interfering signal by subtracting a downward reference video signal from the target video signal, the downward reference video signal leading the target video signal by the predetermined number of horizontal scan lines;

a third subtractor for generating a vertical chrominance signal by subtracting the first vertical chrominance interfering signal from the second vertical chrominance interfering signal;

a third absoluter for transferring the vertical chrominance signal into a positive vertical chrominance signal;

a third low pass filter for transferring the positive vertical chrominance signal into the $D_{vc}$;

a fourth adder for generating a first luminance interfering signal by adding a first rightward reference video signal to the upward reference video signal, the first rightward reference video signal lagging the upward reference video signal by twice an inverse of the sampling frequency;

a fifth adder for generating a second horizontal luminance interfering signal by adding a second rightward reference video signal to the downward reference video signal, the second rightward reference video signal leading the downward reference video signal by twice an inverse of the sampling frequency;

a fourth subtractor for generating a horizontal luminance signal by subtracting the first horizontal luminance interfering signal from the second horizontal luminance interfering signal;
a fourth absoluter for transferring the horizontal luminance signal into a positive horizontal luminance signal; and
a fourth low pass filter for transferring the positive horizontal luminance signal into the $D_{vy}$.

12. The video signal separator of claim 4, wherein the video signal is an NTSC (National Television Standards Committee) video signal.

13. The video signal separator of claim 5, wherein the video signal is a PAL (phase alternation by line) video signal.

\* \* \* \* \*